United States Patent
Sheu et al.

(10) Patent No.: US 6,705,910 B2
(45) Date of Patent: Mar. 16, 2004

(54) MANUFACTURING METHOD FOR AN ELECTRON-EMITTING SOURCE OF TRIODE STRUCTURE

(75) Inventors: Jyh-Rong Sheu, Hsinchu (TW);
Jia-Chong Ho, Taipei Hsien (TW);
Yu-Yang Chang, Tainan (TW);
Hua-Chi Cheng, Shinchu Hsien (TW);
Cheng-Chung Lee, Taidong (TW)

(73) Assignee: Industrial Technology Research Institute, Hsinchu (TW)

( * ) Notice: Subject to any disclaimer, the term of this patent is extended or adjusted under 35 U.S.C. 154(b) by 184 days.

(21) Appl. No.: 10/067,315

(22) Filed: Feb. 7, 2002

(65) Prior Publication Data

US 2003/0049875 A1 Mar. 13, 2003

(30) Foreign Application Priority Data

Sep. 12, 2001 (TW) ....................................... 90122531 A

(51) Int. Cl.$^7$ ................................................. H01J 9/02
(52) U.S. Cl. .................................. 445/24; 430/319
(58) Field of Search ............................. 445/24; 430/319

(56) References Cited

U.S. PATENT DOCUMENTS

| | | | | |
|---|---|---|---|---|
| 6,239,547 B1 | * | 5/2001 | Uemura et al. | 313/495 |
| 6,290,564 B1 | * | 9/2001 | Talin et al. | 445/50 |
| 6,440,761 B1 | * | 8/2002 | Choi | 438/20 |
| 6,465,132 B1 | * | 10/2002 | Jin | 429/231 B |
| 6,512,235 B1 | * | 1/2003 | Eitan et al. | 250/423 F |
| 6,616,497 B1 | * | 9/2003 | Choi et al. | 445/24 |

* cited by examiner

Primary Examiner—Kenneth J. Ramsey
(74) Attorney, Agent, or Firm—Birch, Stewart, Kolasch & Birch, LLP

(57) ABSTRACT

A manufacturing method for an electron-emitting source of triode structure, including forming a cathode layer on a substrate, forming a dielectric layer on the cathode layer, and positioning an opening in the dielectric layer to expose the cathode layer, wherein the opening has a surrounding region, forming a gate layer on the dielectric layer, except on the surrounding region, forming a hydrophilic layer in the opening, forming a hydrophobic layer on the gate layer and the surrounding region, wherein the hydrophobic layer contacts the ends of the hydrophilic layer, dispersing a carbon nanotube solution on the hydrophilic layer using ink jet printing, executing a thermal process step, and removing the hydrophobic layer. According to this method, carbon nanotubes are deposited over a large area in the gate hole.

33 Claims, 11 Drawing Sheets

MANUFACTURING METHOD FOR AN ELECTRON-EMITTING SOURCE OF TRIODE STRUCTURE

BACKGROUND OF THE INVENTION

1. Field of the Invention

The present invention relates in general to a manufacturing method for an electron-emitting source. In particular, the present invention relates to a manufacturing method for an electron-emitting source of triode structure.

2. Description of the Related Art

The method of manufacturing an electron-emitting source using carbon nanotubes (CNT) as an emitter is already widely used in the field of FED (field emission display) diode structure. However, in the field of the CNT-FED of triode structure, it is very difficult to coat the CNT on the negative electrode because the gate hole in the above triode structure is smaller than 100 μm. Therefore, it is very important to find an improved method to accurately coat the CNT on negative electrode.

SUMMARY OF THE INVENTION

The present invention is intended to overcome the above-described disadvantages.

Therefore, the first object of the present invention is to provide a manufacturing method for an electron-emitting source of triode structure, comprising the steps of forming a cathode layer on a substrate, forming a dielectric layer on the cathode layer, and positioning an opening in the dielectric layer to expose the cathode layer wherein the opening has a surrounding region and forming a gate layer on the dielectric layer, except on the surrounding region, forming a hydrophilic layer in the opening, forming a hydrophobic layer on the gate layer and the surrounding region wherein the hydrophobic layer contacts the ends of the hydrophilic layer, dispersing a carbon nanotube solution on the hydrophilic layer using ink jet printing; and executing a thermal process step, and removing the hydrophobic layer.

According to the present invention as described above, carbon nanotubes are accurately deposited over a large area using ink jet printing.

The second object of the present invention is to provide a manufacturing method for an electron-emitting source of triode structure, comprising the steps of forming a cathode layer on a substrate, forming a dielectric layer on the cathode layer, and positioning an opening in the dielectric layer to expose the cathode layer, wherein the opening has a surrounding region, forming a gate layer on the dielectric layer, except on the surrounding region, forming a sacrificial layer on the gate layer and the surrounding region, wherein the opening and the cathode layer are exposed, dispersing a carbon nanotube solution in the opening using screen printing, executing a thermal process step, and removing the sacrificial layer.

According to the present invention as described above, carbon nanotubes are successfully deposited over a large area using screen printing.

The third object of the present invention is to provide a manufacturing method for an electron-emitting source of triode structure, comprising the steps of forming a cathode layer on a substrate, forming a dielectric layer on the cathode layer, and positioning an opening in the dielectric layer to expose the cathode layer, wherein the opening has a surrounding region, forming a gate layer on the dielectric layer, except on the surrounding region, forming a carbon nanotube photoresist layer on the gate layer and covering the opening using spin coating, and patterning the carbon nanotubes photoresist layer in a predetermined pattern, and executing a thermal process step.

According to the present invention as described above, carbon nanotubes are successfully deposited over a large area using spin coating.

The fourth object of the present invention is to provide a manufacturing method for an electron-emitting source of triode structure, comprising the steps of forming a cathode layer on a substrate forming a dielectric layer on the cathode layer, and positioning an opening in the dielectric layer to expose the cathode layer, wherein the opening has a surrounding region, forming a gate layer on the dielectric layer, except on the surrounding region, forming a sacrificial layer on the gate layer and the surrounding region, wherein the opening is exposed, forming an adhesive layer in the opening, forming a carbon nanotube layer on the adhesive layer using an electrophoretic deposition step, executing a thermal process step, and removing the sacrificial layer.

According to the present invention as described above, carbon nanotubes are accurately deposited over a large area using electrophoretic deposition (EPD).

BRIEF DESCRIPTION OF THE DRAWINGS

The present invention can be more fully understood by reading the subsequent detailed description in conjunction with the examples and references made to the accompanying drawings, wherein.

DETAILED DESCRIPTION OF THE PREFERRED EMBODIMENT

Embodiment 1

FIGS. 1a to 1h are sectional views showing a process for manufacturing an electron-emitting source of triode structure using ink jet printing.

Figure 1A:
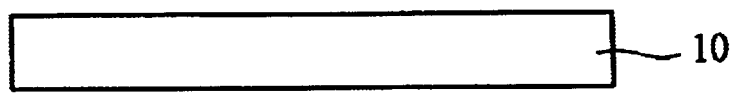
FIGS. 1a to 1h are sectional views showing a process for manufacturing an electron-emitting source of triode structure in accordance with embodiment 1 of the present invention.
Figure 1B:
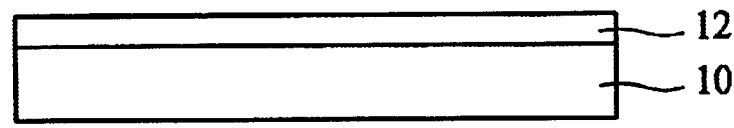
Figure 1C:
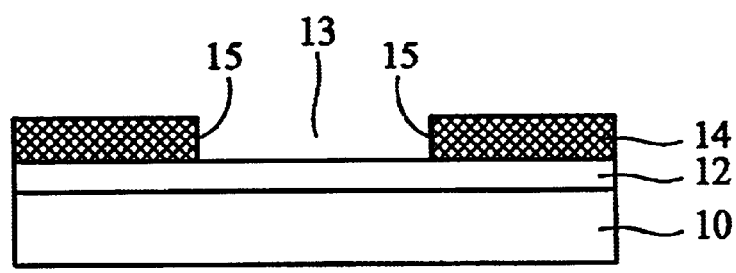
Figure 1D:
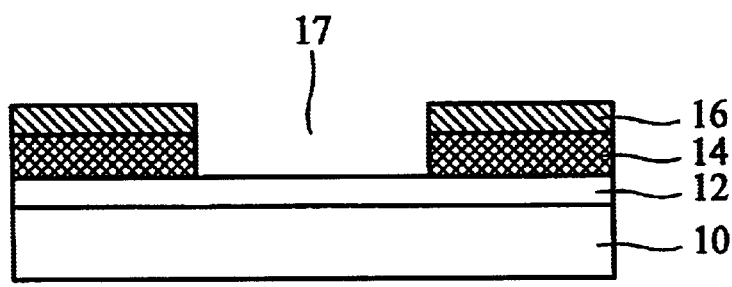

First, as shown in FIG. 1a, a substrate 10 is provided. Secondly, as shown in FIG. 1b, a cathode layer 12 is deposited on the substrate 10. Further, as shown in FIG. 1c, a dielectric layer 14 is deposited on the cathode layer 12, and an opening 13 is positioned in the dielectric layer 14 to expose the cathode layer 12, wherein the opening 13 has a surrounding region 15. Furthermore, as shown in FIG. 1d, a gate layer 16 is deposited on the dielectric layer 14 except the surrounding region 15. a gate hole 17 is formed after depositing the gate layer 16.

Figure 1E:
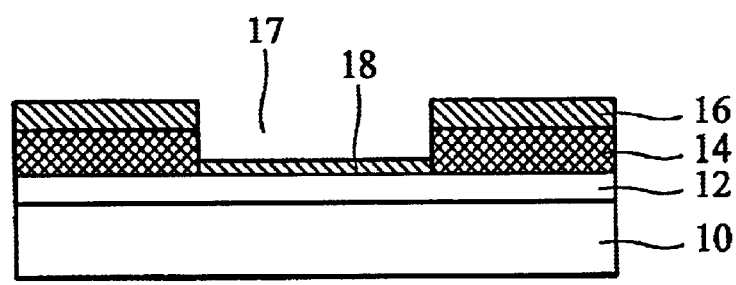

As shown in FIG. 1e, a hydrophilic layer 18 is deposited in the gate hole 17. Because the hydrophilic layer 18 absorbs the water of a carbon nanotube solution used in this embodiment, it successfully prevents the CNT solution from overflowing the gate hole 17.

Figure 1F:
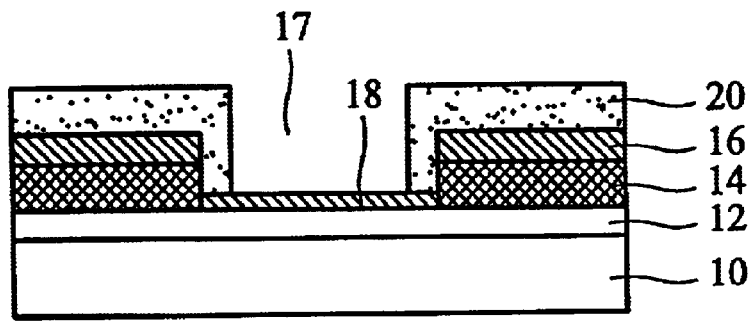

As shown in FIG. 1f, a hydrophobic layer 20 is deposited on the surface of the gate layer 16 and the surrounding region 15, wherein the hydrophobic layer 20 contacts the ends of the hydrophilic layer 18. Because the hydrophobic layer 20 defines the position where CNT solution formed on the cathode layer 12 and prevents CNT solution from being absorbed into the sidewalls of the gate hole 17, it successfully solves the leakage current or short problems caused by the residue of the CNT solution between the cathode layer 12 and the gate layer 16 after thermal process step.

Figure 1G:
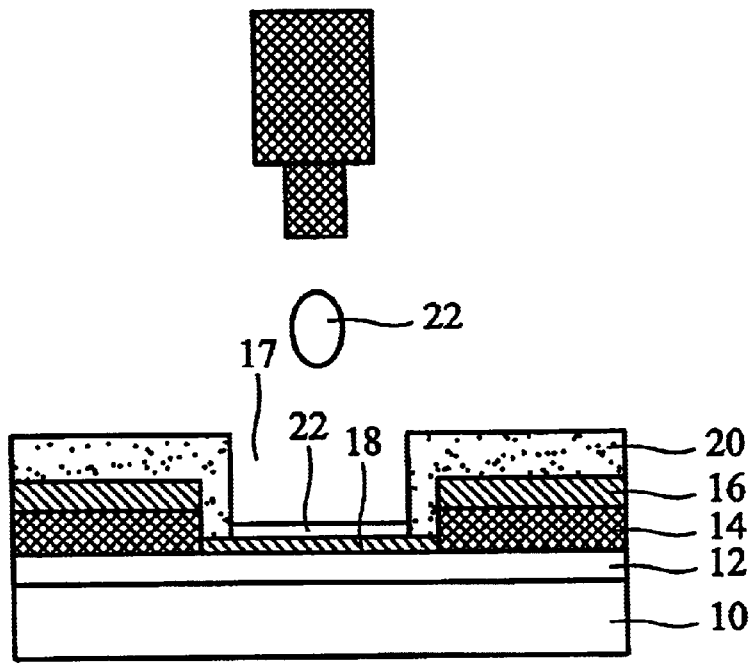
Figure 1H:
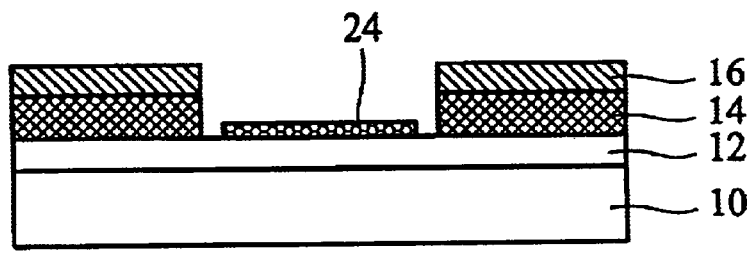

As shown in FIG. 1g, a CNT solution 22 is dispersed on the hydrophilic layer 18 using ink jet printing. Finally, a thermal process step is executed, and the hydrophobic layer 20 is removed to form a CNT emitter 24, as shown in FIG. 1h.

As mentioned above, according to embodiment 1 of the present invention, carbon nanotubes are accurately deposited over a large area using ink jet printing, and an electron-emitting source of triode structure having good properties, and used as CNT-FED, is obtained.

The substrate 10 is preferably made of glass. The cathode layer 12 or the gate layer 16 is preferably composed of electric conductors such as silver. The hydrophobic layer 20 is preferably composed of hydrophobic materials such as hydrophobic photoresist. The above thermal process preferably adopts a sintering step.

Embodiment 2

FIGS. 2a to 2h are sectional views showing a process for manufacturing an electron-emitting source of triode structure using screen printing.

Figure 2A:
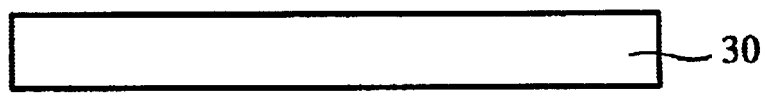
FIGS. 2a to 2h are sectional views showing a process for manufacturing an electron-emitting source of triode structure in accordance with embodiment 2 of the present invention.
Figure 2B:
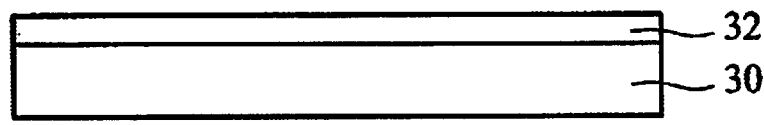
Figure 2C:
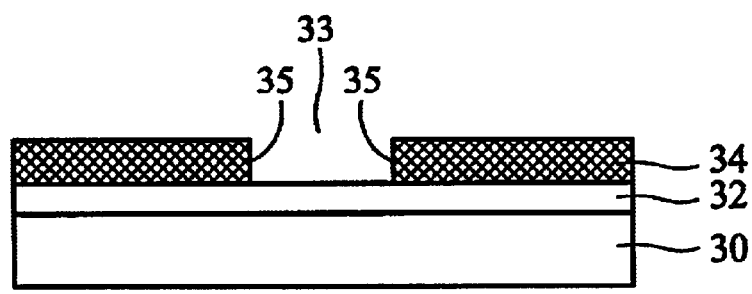
Figure 2D:
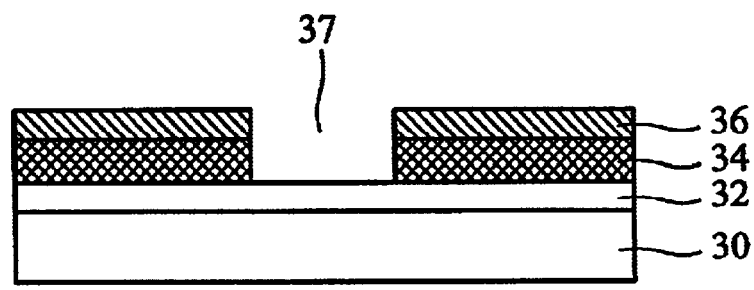

First, as shown in FIG. 2a, a substrate 30 is provided. Secondly, as shown in FIG. 2b, a cathode layer 32 is deposited on the substrate 30. Further, as shown in FIG. 2c, a dielectric layer 34 is deposited on the cathode layer 32, and an opening 33 is positioned in the dielectric layer 34 to expose the cathode layer 32, wherein the opening 33 has a surrounding region 35. Furthermore, as shown in FIG. 2d, a gate layer 36 is deposited on the dielectric layer 34 except the surrounding region 35. a gate hole 37 is formed after depositing the gate layer 36.

Figure 2E:
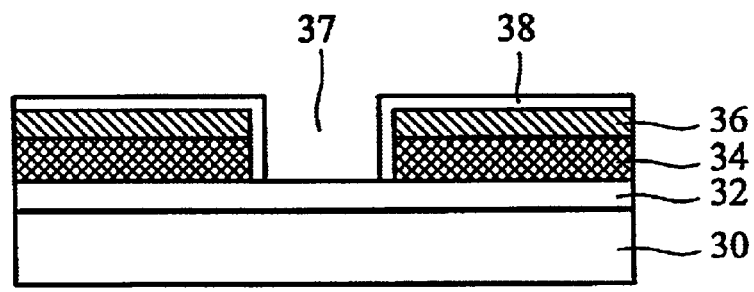

As shown in FIG. 2e, a sacrificial layer 38 is deposited on the surface of the gate layer 36 and the surrounding region 35, wherein the gate hole 37 and the cathode layer 32 are exposed. Because the sacrificial layer 38 defines the position where the CNT solution is formed on the cathode layer 32, and prevents CNT solution from being absorbed into the sidewalls of the gate hole 37 or the surface of the gate layer 36, it successfully solves the leakage current or short problems caused by the residue of the CNT solution on the cathode layer 32 or the gate layer 36 after thermal process step.

Figure 2F:
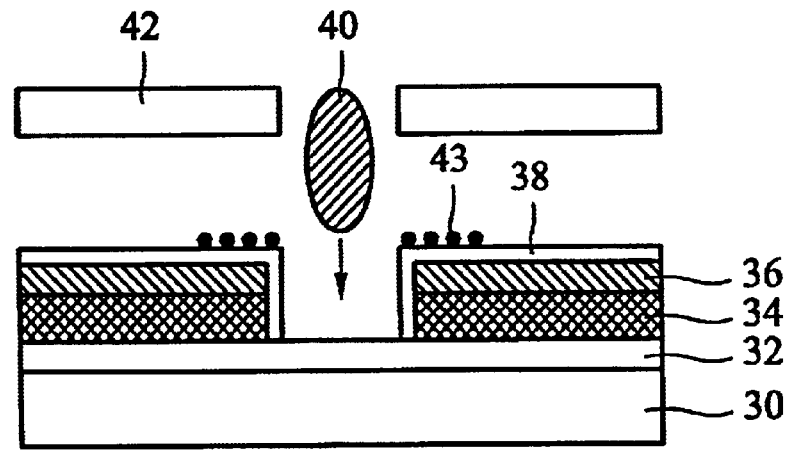
Figure 2G:
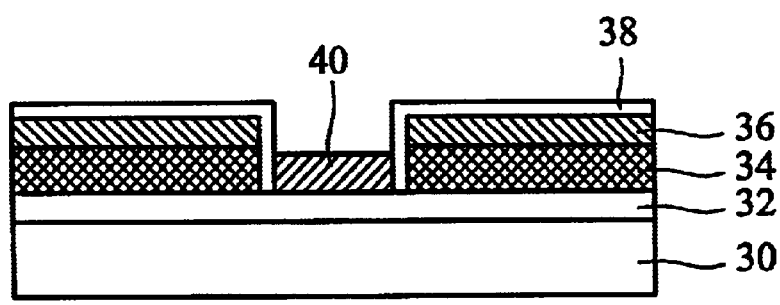
Figure 2H:
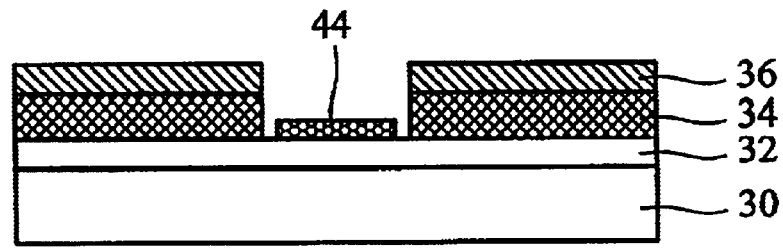

As shown in FIG. 2f, a CNT solution 40 is dispersed on the gate hole 37 by screen mask 42 using screen printing. At this time, some residue 43 of the above CNT solution is dropped on the surface of the sacrificial layer 38. In this case, the residue 43 is removed using a polish step, as shown in FIG. 2g. Finally, a thermal process step is executed, and the sacrificial layer 38 is removed to form a CNT emitter 44, as shown in FIG. 2h.

As mentioned above, according to embodiment 2 of the present invention, carbon nanotubes are accurately deposited over a large area using screen printing, and an electron-emitting source of triode structure having good properties, and used as CNT-FED, is obtained.

The substrate 30 is preferably made of glass. The cathode layer 32 or the gate layer 36 is preferably composed of electric conductors such as silver. The sacrificial layer 38 is preferably composed of photosensitive materials such as photoresists, peelable materials such as hydrophilic materials and lipophilic materials, soluble materials, sinterable materials, or etchable materials. The above thermal process preferably adopts a sintering step.

Embodiment 3

FIGS. 3a to 3h are sectional views showing a process for manufacturing an electron-emitting source of triode structure using spin coating.

Figure 3A:
FIGS. 3a to 3h are sectional views showing a process for manufacturing an electron-emitting source of triode structure in accordance with embodiment 3 of the present invention.
Figure 3B:
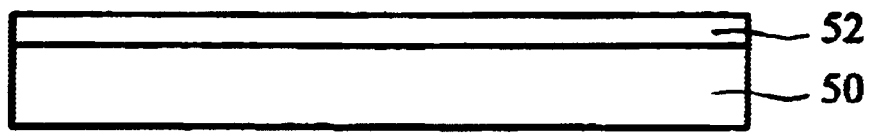
Figure 3C:
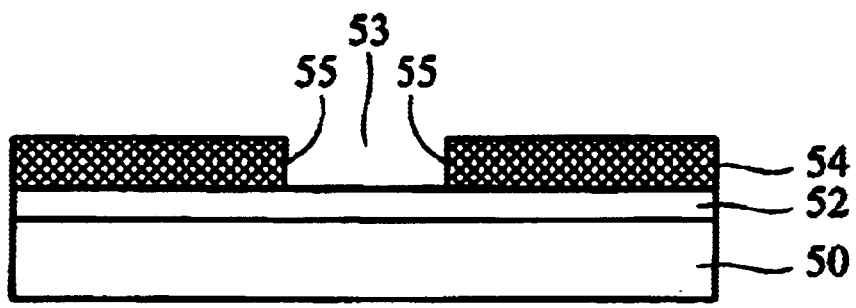
Figure 3D:
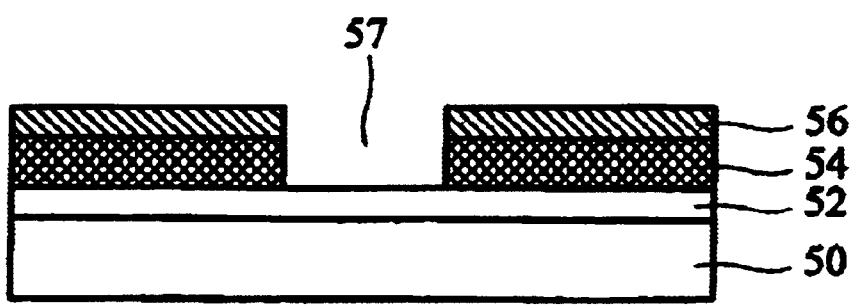

First, as shown in FIG. 3a, a substrate 50 is provided. Secondly, as shown in FIG. 3b, a cathode layer 52 is deposited on the substrate 50. Further, as shown in FIG. 3c, a dielectric layer 54 is deposited on the cathode layer 52, and an opening 53 is positioned in the dielectric layer 54 to expose the cathode layer 52, wherein the opening 53 has a surrounding region 55. Furthermore, as shown in FIG. 3d, a gate layer 56 is deposited on the dielectric layer 54 except the surrounding region 55. a gate hole 57 is formed after depositing the gate layer 56.

Figure 3E:
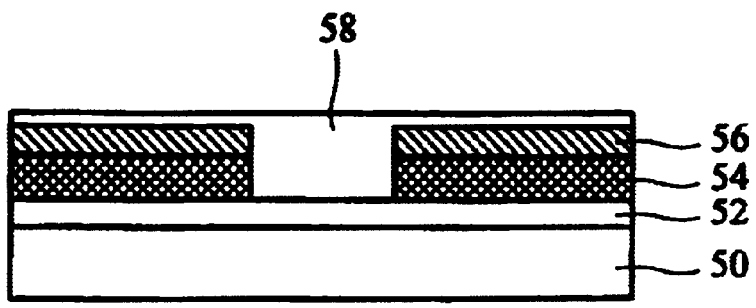
Figure 3F:
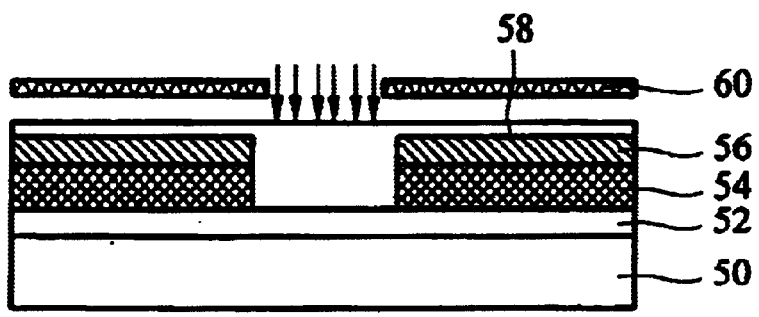
Figure 3G:
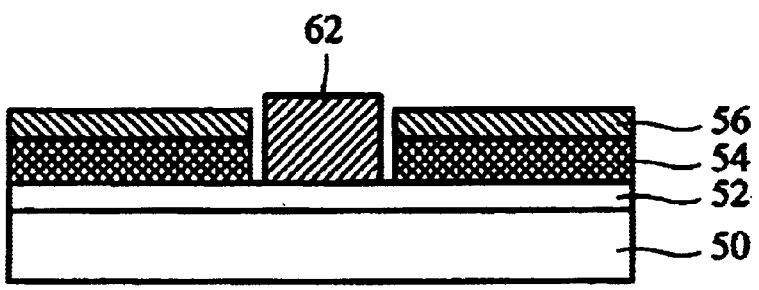
Figure 3H:
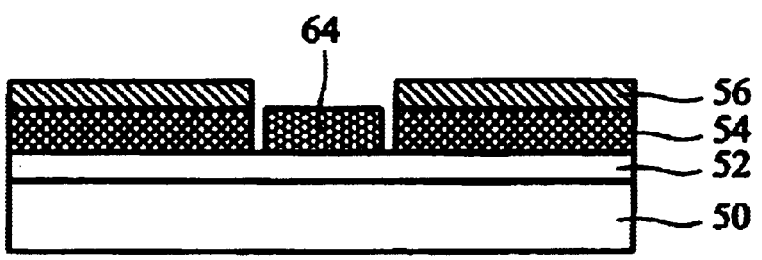

As shown in FIG. 3e, a carbon nanotube photoresist layer 58 is deposited on the gate layer 56 and covering the gate hole 57 using spin coating. The carbon nanotube photoresist layer 58 is preferably composed of positive photoresist or negative photoresist. In this case, the carbon nanotube photoresist layer 58 is composed of negative photoresist and the CNT solution. Furthermore, as shown in FIGS. 3f to 3g, a CNT emitter pattern 62 is exposed by mask 60 using ultraviolet light and then patterned. In this case, the opening width of the mask 60 is smaller than the width of the gate hole 57 in order to prevent the patterned CNT emitter pattern 62 from contacting the gate layer 56 to prevent short problem. Finally, a thermal process step is executed to form a CNT emitter 64, as shown in FIG. 3h.

As mentioned above, according to embodiment 3 of the present invention, carbon nanotubes are accurately deposited over a large area using spin coating, and an electron-emitting source of triode structure having good properties, and used as CNT-FED, is obtained.

The substrate 50 is preferably made of glass. The cathode layer 52 or the gate layer 56 is preferably composed of electric conductors such as silver. The above thermal process preferably adopts a sintering step.

Embodiment 4

FIGS. 4a to 4h are sectional views showing a process for manufacturing an electron-emitting source of triode structure using electrophoretic deposition (called EPD).

Figure 4A:
FIGS. 4a to 4g are sectional views showing a process for manufacturing an electron-emitting source of triode structure in accordance with embodiment 4 of the present invention.
Figure 4B:
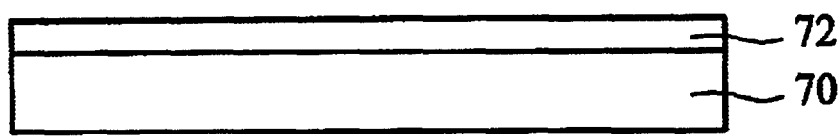
Figure 4C:
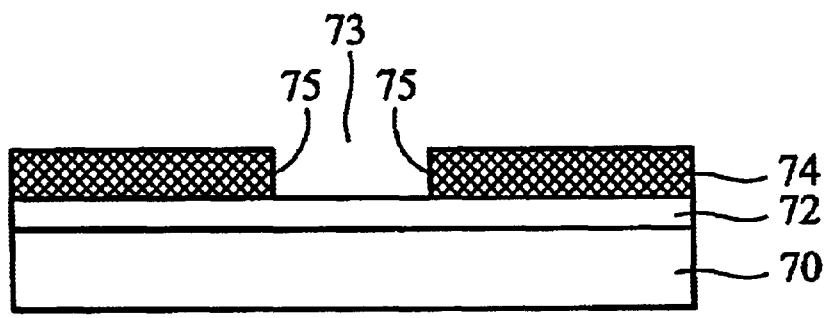
Figure 4D:
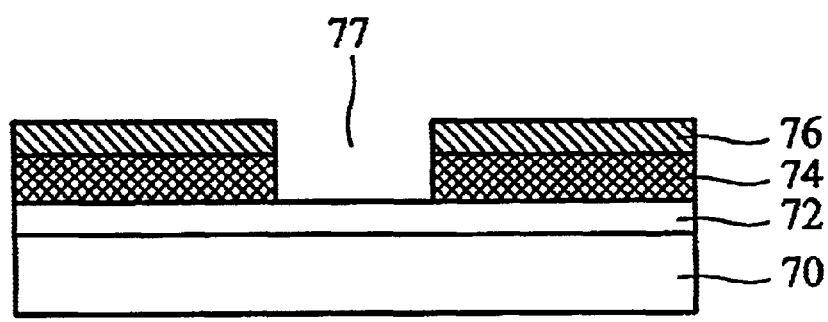

First, as shown in FIG. 4a, a substrate 70 is provided. Secondly, as shown in FIG. 4b, a cathode layer 72 is deposited on the substrate 70. Further, as shown in FIG. 4c, a dielectric layer 74 is deposited on the cathode layer 72, and an opening 73 is positioned in the dielectric layer 74 to expose the cathode layer 72, wherein the opening 73 has a surrounding region 75. Furthermore, as shown in FIG. 4d, a gate layer 76 is deposited on the dielectric layer 74 except the surrounding region 75. a gate hole 77 is formed after depositing the gate layer 76.

Figure 4E:
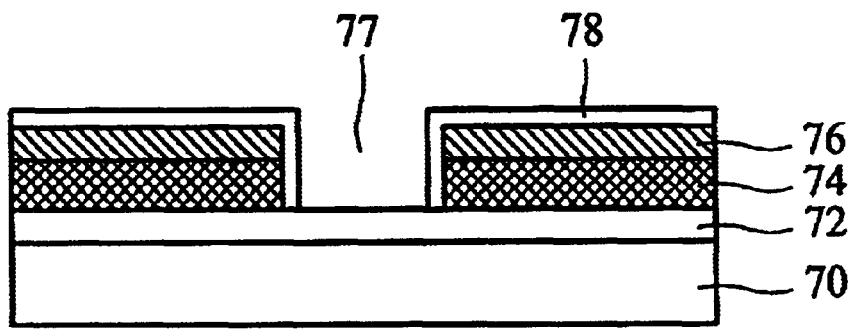

As shown in FIG. 4e, a sacrificial layer 78 is deposited on the surface of the gate layer 76 and the surrounding region 75, wherein the gate hole 77 and the cathode layer 72 are exposed. Because the sacrificial layer 78 defines the position where CNT formed on the cathode layer 72, and prevents CNT from being absorbed into the sidewalls of the gate hole 77 or the surface of the gate layer 76 during electrophoretic deposition step, it successfully solves the leakage current or short problems caused by the residue of the CNT left on the dielectric layer 74 or the gate layer 76 after thermal process step.

Figure 4F:
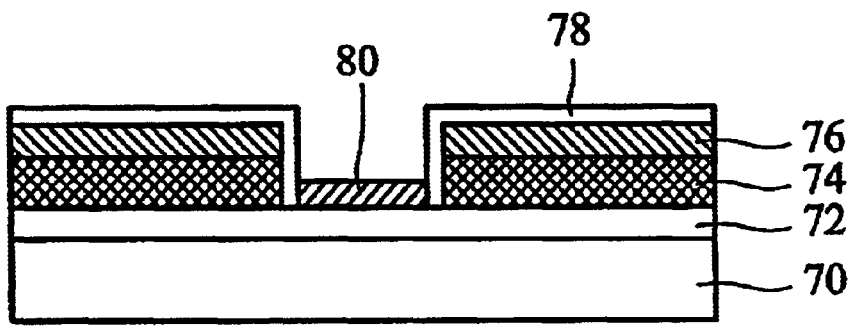

As shown in FIG. 4f, an adhesive layer 80 is deposited in the gate hole 77. Further, CNT is deposited on the adhesive layer 80 using an electrophoretic deposition step. In this case, the electrophoretic deposition preferably adopts cathode electrophoretic deposition, anode electrophoretic deposition, or suspensing electrophoretic deposition.

Figure 5A:
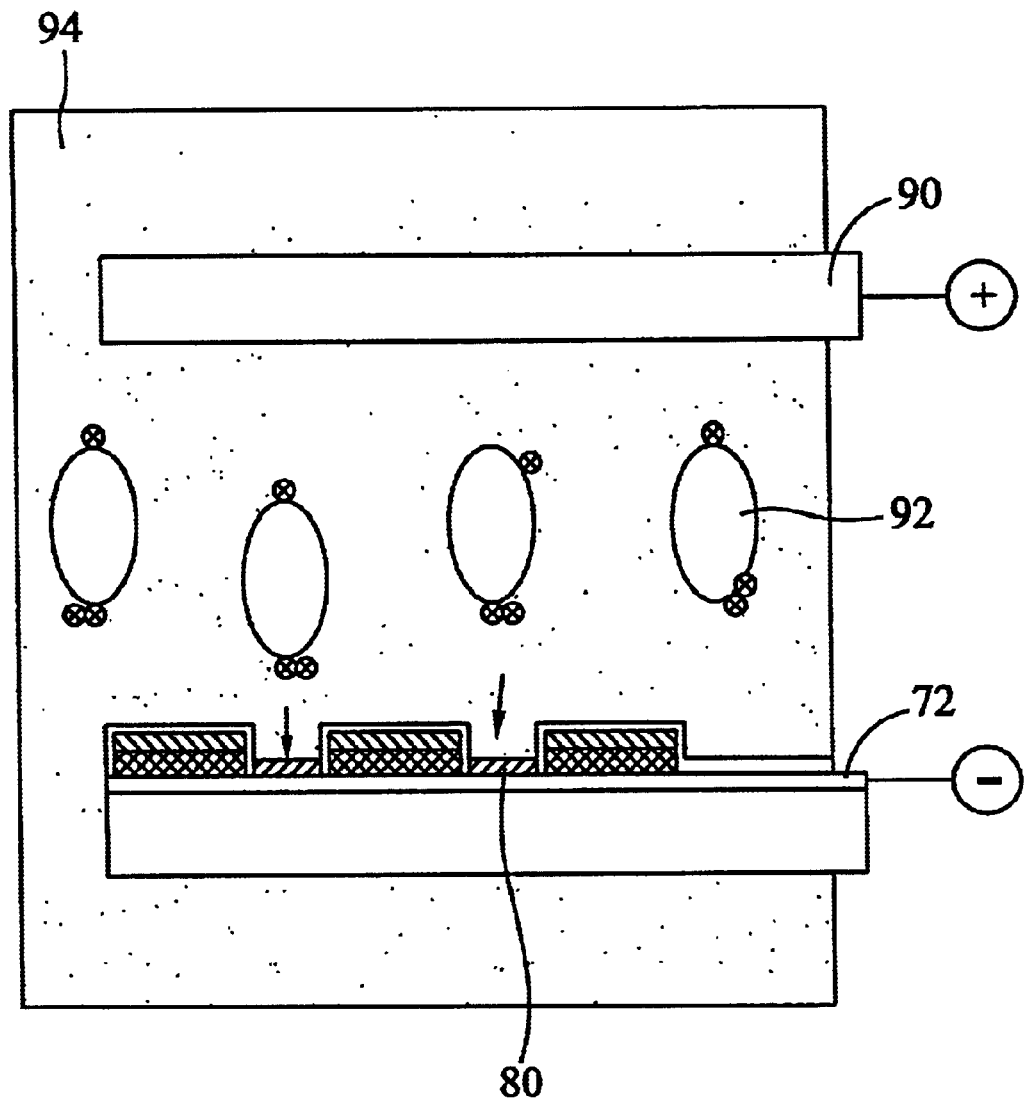
FIGS. 5a to 5c are sectional views showing cathode electrophoretic deposition, anode electrophoretic deposition, and suspensing electrophoretic deposition respectively.
Figure 5B:
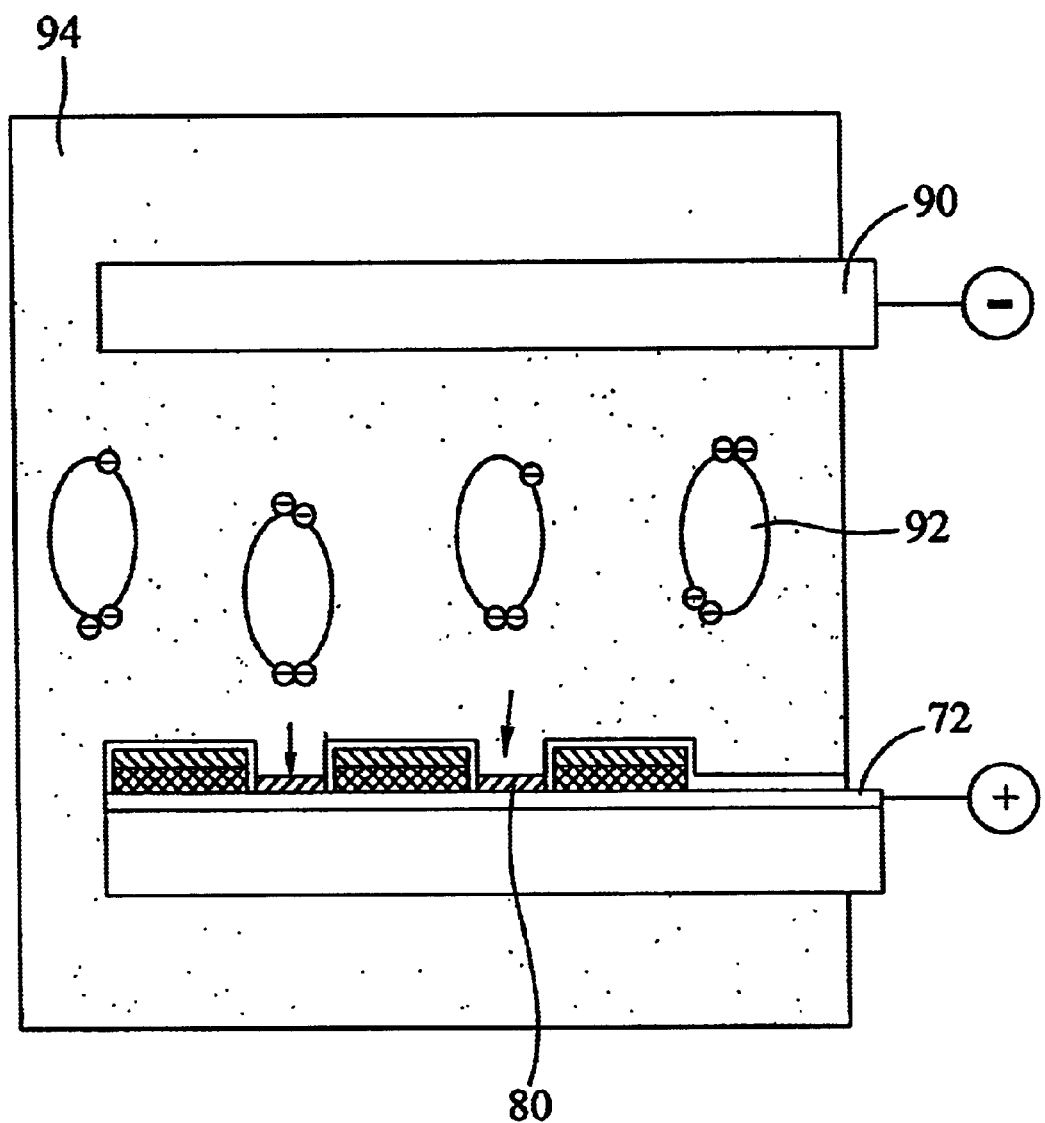
Figure 5C:
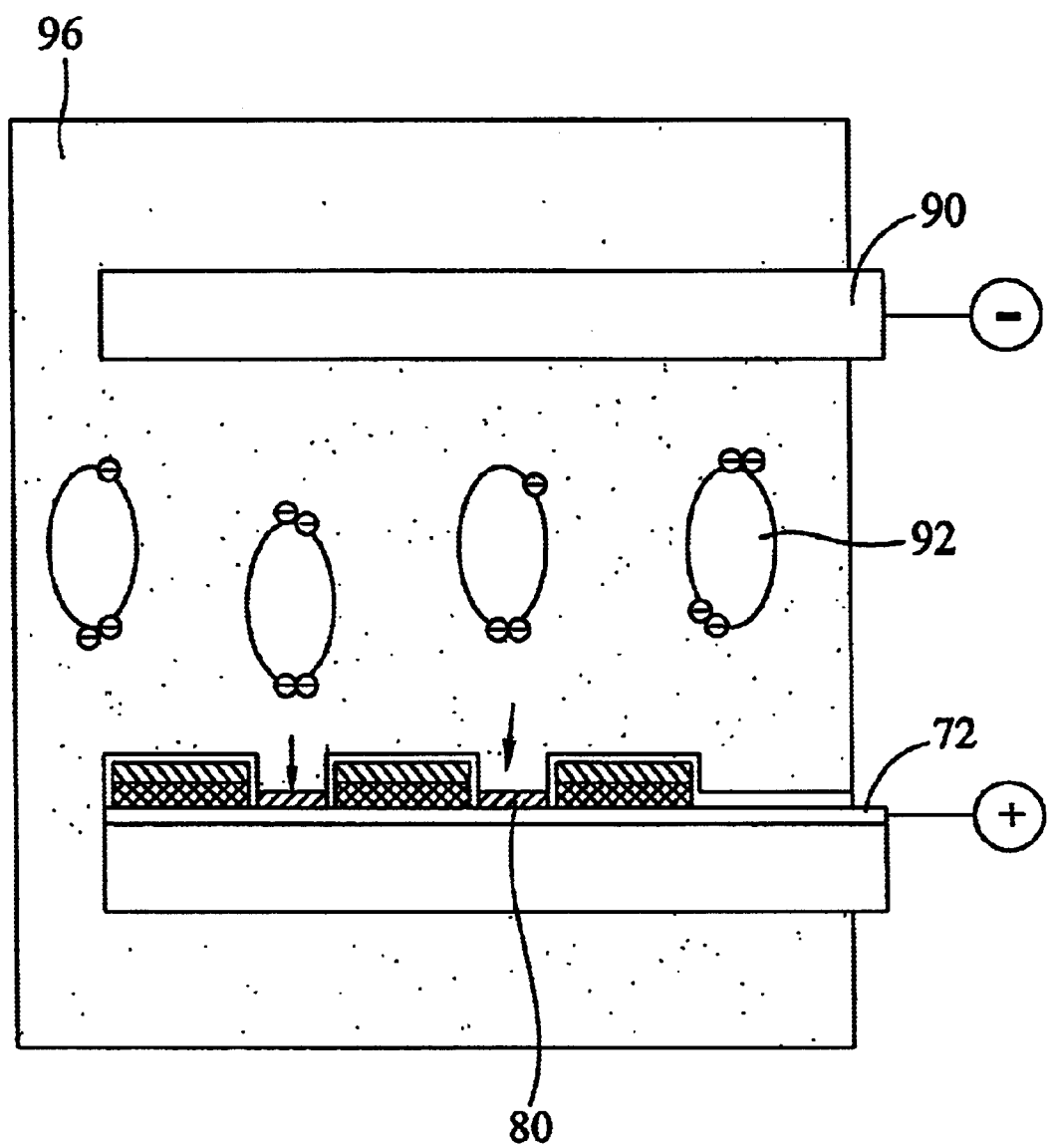

FIG. 5a is a sectional view showing cathode electrophoretic deposition. In this FIG. 5a, 90 and 94 show a metal electrode and an organic solvent system, respectively. Because of a cathode layer 72 is connected with negative electrode, a positive CNT particle 92 is attracted to deposit on the adhesive layer 80. Further, FIG. 5b is a sectional view showing anode electrophoretic deposition. In this case, because the cathode layer 72 is connected with positive electrode, the negative CNT particle 92 is attracted to deposit on the adhesive layer 80. FIG. 5c is a sectional view showing suspensing electrophoretic deposition. Water solution system 96 preferably uses distilled water or deionized water as solvent, neither of which interact with sacrificial layer 78.

Figure 4G:
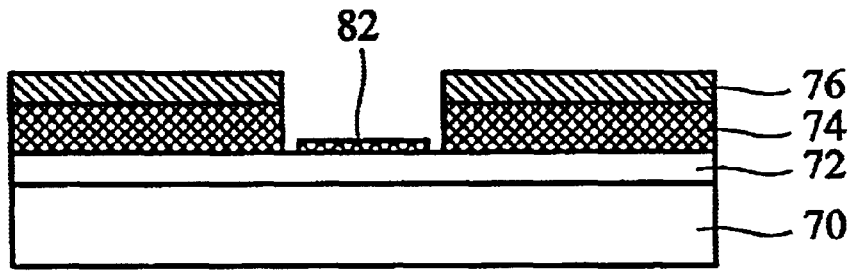

Lastly, a thermal process step is executed, and the sacrificial layer 78 is removed to form a CNT emitter 82, as shown in FIG. 4g.

As mentioned above, according to embodiment 4 of the present invention, carbon nanotubes are accurately deposited over a large area using electrophoretic deposition, and an electron-emitting source of triode structure having good properties, and used as CNT-FED, is obtained.

The substrate 70 is preferably made of glass. The cathode layer 72 or the gate layer 76 is preferably composed of electric conductors such as silver. The sacrificial layer 78 is preferably composed of photosensitive materials such as photoresists, peelable materials such as hydrophilic materials and lipophilic materials, soluble materials, sinterable materials, or etchable materials. The above thermal process preferably adopts a sintering step.

Finally, while the invention has been described by way of example and in terms of the preferred embodiment, it is to be understood that the invention is not limited to the disclosed embodiments. On the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A manufacturing method for an electron-emitting source of triode structure, comprising the steps of:
   forming a cathode layer on a substrate;
   forming a dielectric layer on the cathode layer, and positioning an opening in the dielectric layer to expose the cathode layer, wherein the opening has a surrounding region;
   forming a gate layer on the dielectric layer, except on the surrounding region;
   forming a hydrophilic layer in the opening;
   forming a hydrophobic layer on the gate layer and the surrounding region, wherein the hydrophobic layer contacts the ends of the hydrophilic layer;
   dispersing a carbon nanotube solution on the hydrophilic layer using ink jet printing; and
   executing a thermal process step, and removing the hydrophobic layer.

2. The manufacturing method for an electron-emitting source of triode structure as claimed in claim 1, wherein the substrate is made of glass.

3. The manufacturing method for an electron-emitting source of triode structure as claimed in claim 1, wherein the cathode layer is composed of electric conductors.

4. The manufacturing method for an electron-emitting source of triode structure as claimed in claim 3, wherein the electric conductor is silver.

5. The manufacturing method for an electron-emitting source of triode structure as claimed in claim 1, wherein the gate layer is composed of electric conductors.

6. The manufacturing method for an electron-emitting source of triode structure as claimed in claim 5, wherein the electric conductor is silver.

7. The manufacturing method for an electron-emitting source of triode structure as claimed in claim 1, wherein the hydrophobic layer is composed of hydrophobic materials.

8. The manufacturing method for an electron-emitting source of triode structure as claimed in claim 1, wherein the thermal process step is a sintering step.

9. A manufacturing method for an electron-emitting source of triode structure, comprising the steps of:
   forming a cathode layer on a substrate;
   forming a dielectric layer on the cathode layer, and positioning an opening in the dielectric layer to expose the cathode layer, wherein the opening has a surrounding region;
   forming a gate layer on the dielectric layer, except on the surrounding region;
   forming a sacrificial layer on the gate layer and the surrounding region, wherein the opening and the cathode layer are exposed;
   dispersing a carbon nanotube solution in the opening using screen printing; and
   executing a thermal process step, and removing the sacrificial layer.

10. The manufacturing method for an electron-emitting source of triode structure as claimed in claim 9, wherein the substrate is made of glass.

11. The manufacturing method for an electron-emitting source of triode structure as claimed in claim 9, wherein the cathode layer is composed of electric conductors.

12. The manufacturing method for an electron-emitting source of triode structure as claimed in claim 11, wherein the electric conductor is silver.

13. The manufacturing method for an electron-emitting source of triode structure as claimed in claim 9, wherein the gate layer is composed of electric conductors.

14. The manufacturing method for an electron-emitting source of triode structure as claimed in claim 13, wherein the electric conductor is silver.

15. The manufacturing method for an electron-emitting source of triode structure as claimed in claim 9, wherein the sacrificial layer is composed of photosensitive materials, hydrophilic materials, lipophilic materials, peelable materials, soluble materials, sinterable materials, or etchable materials.

16. The manufacturing method for an electron-emitting source of triode structure as claimed in claim 9, wherein the thermal process step is sintering step.

17. A manufacturing method for an electron-emitting source of triode structure, comprising the steps of:
   forming a cathode layer on a substrate;

forming a dielectric layer on the cathode layer, and positioning an opening in the dielectric layer to expose the cathode layer, wherein the opening has a surrounding region;

forming a gate layer on the dielectric layer, except on the surrounding region;

forming a carbon nanotube photoresist layer on the gate layer and covering the opening using spin coating, and patterning the carbon nanotubes photoresist layer in a predetermined pattern; and executing a thermal process step.

18. The manufacturing method for an electron-emitting source of triode structure as claimed in claim 17, wherein the substrate is made of glass.

19. The manufacturing method for an electron-emitting source of triode structure as claimed in claim 17, wherein the cathode layer is composed of electric conductors.

20. The manufacturing method for an electron-emitting source of triode structure as claimed in claim 19, wherein the electric conductor is silver.

21. The manufacturing method for an electron-emitting source of triode structure as claimed in claim 17, wherein the gate layer is composed of electric conductors.

22. The manufacturing method for an electron-emitting source of triode structure as claimed in claim 21, wherein the electric conductor is silver.

23. The manufacturing method for an electron-emitting source of triode structure as claimed in claim 17, wherein the width of the predetermined pattern is smaller than the width of the opening.

24. The manufacturing method for an electron-emitting source of triode structure as claimed in claim 17, wherein the thermal process step is an sintering step.

25. A manufacturing method for an electron-emitting source of triode structure, comprising the steps of:

forming a cathode layer on a substrate;

forming a dielectric layer on the cathode layer, and positioning an opening in the dielectric layer to expose the cathode layer, wherein the opening has a surrounding region;

forming a gate layer on the dielectric layer, except on the surrounding region;

forming a sacrificial layer on the gate layer and the surrounding region, wherein the opening is exposed;

forming an adhesive layer in the opening;

forming a carbon nanotube layer on the adhesive layer using a electrophoretic deposition step; and executing a thermal process step, and removing the sacrificial layer.

26. The manufacturing method for an electron-emitting source of triode structure as claimed in claim 25, wherein the substrate is made of glass.

27. The manufacturing method for an electron-emitting source of triode structure as claimed in claim 25, wherein the cathode layer is composed of electric conductors.

28. The manufacturing method for an electron-emitting source of triode structure as claimed in claim 27, wherein the electric conductor is silver.

29. The manufacturing method for an electron-emitting source of triode structure as claimed in claim 25, wherein the gate layer is composed of electric conductors.

30. The manufacturing method for an electron-emitting source of triode structure as claimed in claim 29, wherein the electric conductor is silver.

31. The manufacturing method for an electron-emitting source of triode structure as claimed in claim 25, wherein the electrophoretic deposition step is cathode electrophoretic deposition, anode electrophoretic deposition, or suspensing electrophoretic deposition.

32. The manufacturing method for an electron-emitting source of triode structure as claimed in claim 25, wherein the thermal process step is a sintering step.

33. The manufacturing method for an electron-emitting source of triode structure as claimed in claim 25, wherein the sacrificial layer is composed of one selected from photosensitive materials, hydrophilic materials, lipophilic materials, peelable materials, soluble materials, sinterable materials, or etchable materials.

* * * * *